A. P. COLIAS.
COOKING APPARATUS.
APPLICATION FILED MAR. 10, 1919.

1,312,833.

Patented Aug. 12, 1919.
2 SHEETS—SHEET 1.

INVENTOR
Alexander P. Colias
BY
ATTORNEYS

A. P. COLIAS.
COOKING APPARATUS.
APPLICATION FILED MAR. 10, 1919.
1,312,833.
Patented Aug. 12, 1919.
2 SHEETS—SHEET 2.
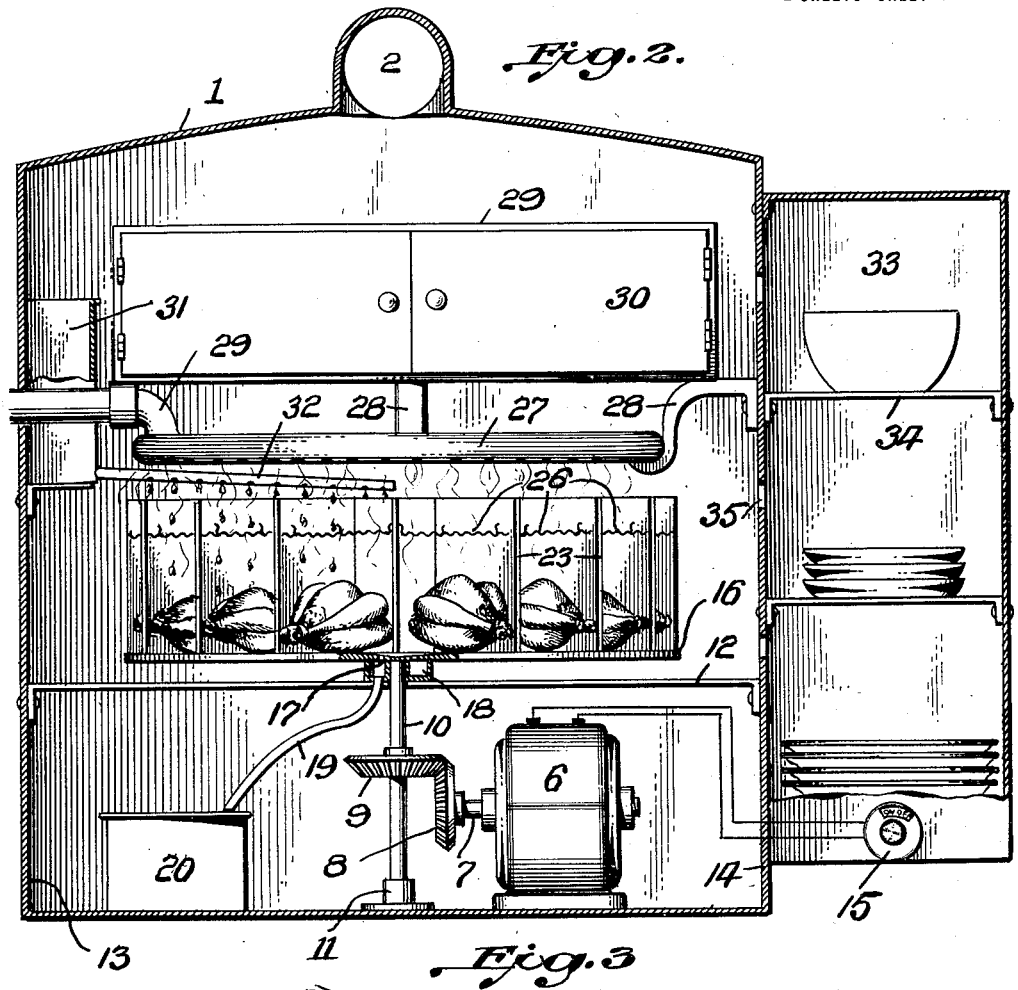
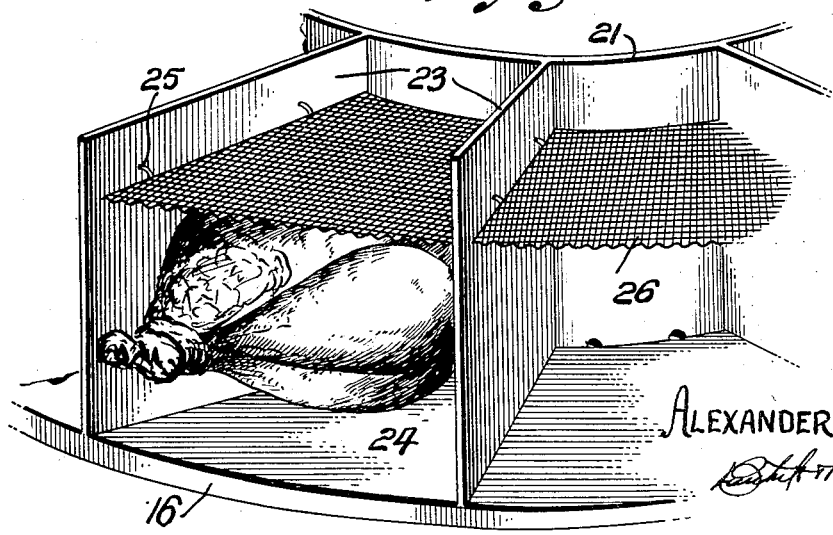
Inventor
ALEXANDER P. COLIAS
Attorneys

UNITED STATES PATENT OFFICE.

ALEXANDER P. COLIAS, OF DETROIT, MICHIGAN.

COOKING APPARATUS.

1,312,833. Specification of Letters Patent. Patented Aug. 12, 1919.

Application filed March 10, 1919. Serial No. 281,579.

*To all whom it may concern:*

Be it known that I, ALEXANDER P. COLIAS, a subject of the King of Greece, residing at Detroit, in the county of Wayne and State of Michigan, have invented certain new and useful Improvements in Cooking Apparatus, of which the following is a specification, reference being had therein to the accompanying drawings.

This invention relates to cooking apparatus and has special reference to a combined range, baking oven, warming oven and inclosure or housing for the range and baking oven.

The primary object of my invention is to provide a rotary grid or cooking member on which various kinds of food may be broiled, toasted or otherwise cooked in a uniform manner, the food being subjected to the heat of a burner or other cooking agent located above the rotary grid or cooking member, and novel means is employed for imparting a rotary movement to the grid or cooking member.

Another object of this invention is to provide a horizontal rotary cooking apparatus that may be advantageously employed for broiling chickens and other fowl, steaks and other meat, and for preparing various kinds of food, and the cooking apparatus has been primarily designed for large cafés, hotels and such places where a large quantity of food is to be prepared particularly so that it may be observed by the patrons of the café.

A further object of my invention is to provide a rotary cooking apparatus and means for receiving drippings from the apparatus and basting food thereon.

A still further object of my invention is to attain the above and other objects by a structure wherein the parts are made with a view of reducing the cost of manufacture and at the same time retain those features by which durability, accessibility and sanitation are secured. With such ends in view, my invention resides in the novel construction, combination and arrangement of parts to be hereinafter specifically described and then claimed.

Reference will now be had to the drawings, wherein

Fig. 2 is a vertical cross sectional view of the same;

Fig. 3 is an enlarged perspective view of a portion of a rotary grid or cooking member.

Figure 1:
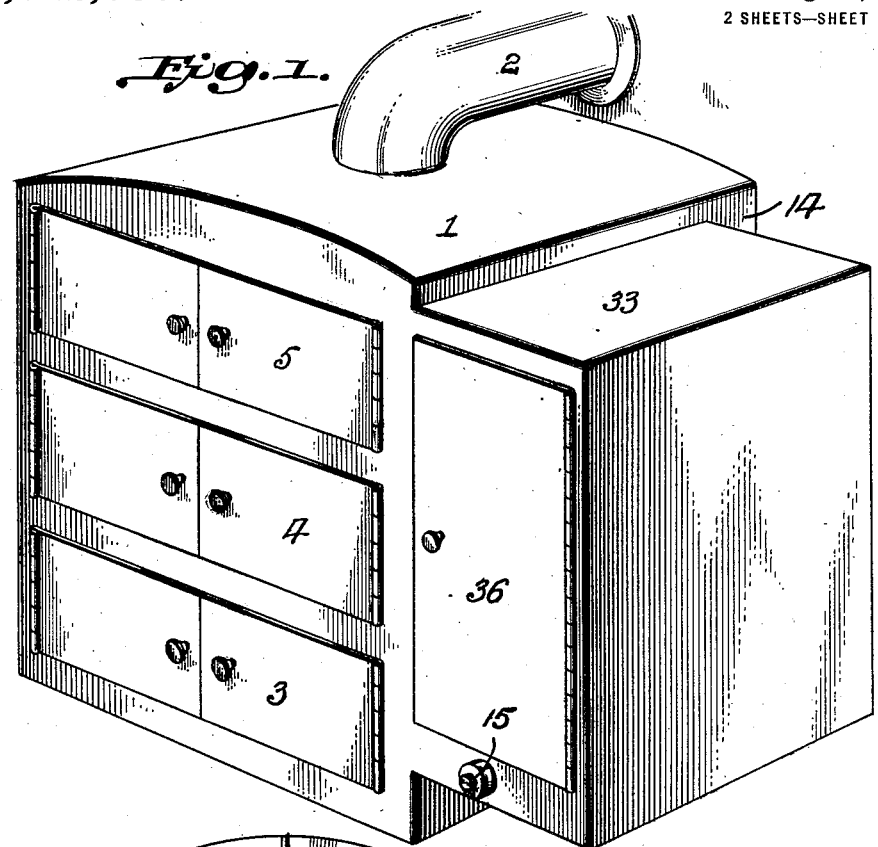
Figure 1 is a perspective view of the cooking apparatus.
Figure 4:
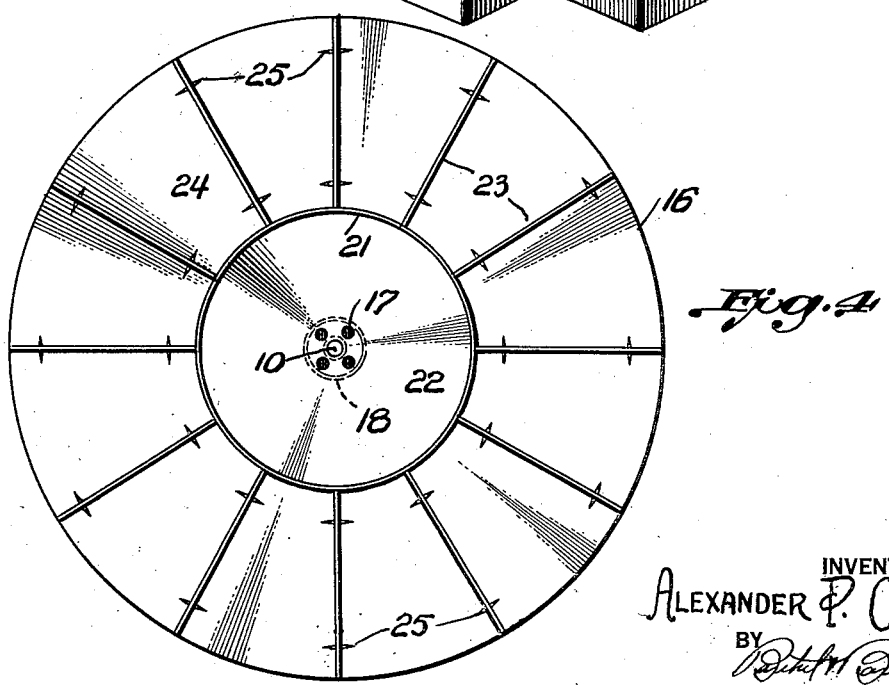
Fig. 4 is a plan of the rotary grid or cooking member.

To put my invention into practice, I provide a rectangular inclosure or housing 1 which may be made of sheet metal, enameled ware or any material suitable for culinary furniture. The top of the housing 1 has a suitable exhaust flue 2 and the front wall of the housing has suitable doors 3, 4 and 5 permitting of easy access being had to different portions of the interior of the housing, but in some instances the doors 4 and 5 may be dispensed with, particularly when the cooking apparatus is used in a café or restaurant where patrons desire to observe or scrutinize the cooking of food.

The doors 3 permit of access being had to the lower part of the housing 1 in which is located a conventional form of electric motor 6 representing a suitable source of power or an operating device and this motor has its armatured shaft 7 provided with a beveled gear wheel 8 meshing with a horizontal beveled gear wheel 9, on a vertically disposed revoluble shaft 10 that has its lower end journaled in a suitable thrust bearing 11 on the bottom of the housing 1 and its upper end journaled in a horizontal support or bearing 12, carried by the side walls 13 and 14 of said housing. The motor 6 may be operated from a suitable source of electrical energy and its operation may be controlled by a suitable switch 15.

The doors 4 permit of easy access being had to a rotary grid or cooking member 16 on the upper end of the shaft 10, said rotary grid being horizontally disposed above the support or bearing 12. The cooking grid is somewhat similar to a table and has its top inclined toward the center so that liquid on the rotary grid will drain inwardly from the marginal edges of the grid and pass through a series of openings 17 into a stationary receptacle 18 below the grid and on the support 12, said receptacle collecting drippings of food prepared on the rotary grid. The receptacle 18 is connected by a drain tube 19 to a suitable collecting receptacle 20 on the bottom of the housing and through the medium of the doors 3 said receptacle may be readily removed.

On the cooking grid or member 16 is a circular wall 21 that is concentric of the rotary grid and provides a central compartment 22 in which various kinds of food may be placed. The circular wall 21 coöperates with the grid in supporting radially disposed partitions 23 and these partitions form separate radial compartments 24 in which various kinds of food may be placed, particularly chicken or other fowl.

The partitions or walls 23 have the sides thereof provided with hooks, brackets and other supporting or fastening means 25 for detachable screens or grids 26 which are supported above the rotary grid or member 16. It is on these detachable grids that steaks and other food may be placed to be broiled, toasted or otherwise prepared.

The rotary grid or member 16 has a horizontally disposed burner 27 supported by suitable brackets or hangers 28 and also by the gas or fuel inlet pipe 29. This burner is adapted to project its flames toward the rotary grid or member 16 and cook food placed on said rotary grid or member.

Above the burner 27 is a baking oven 29, which may have doors 30 and access is had to this baking oven through the medium of the doors 5 of the housing 1. The oven 29 is adapted to be heated from the burner 27 and said burner may be designed to direct flames toward the bottom of the baking oven, or in lieu of said burner any other suitable heating means may be installed.

The side wall 13 of the housing 1 is provided with a receptacle 31 adapted to receive the contents of the receptacle 20 and the receptacle 31 has an angularly disposed drain tube 32 extending between the burner 27 and the rotary grid or member 16, said drain tube having a series of apertures so that drippings from the receptacle 31 may be discharged on to food on the rotary grid or member 16 to baste the same.

Connected to the wall 14 of the housing 1 is a warming oven 33 having shelves 34 on which dishes may be placed and heated from the heat radiating from the wall 14 or passing through openings 35 in said wall. The front wall of the warming oven 33 may have a suitable door or closure 36 and it is on this front wall of the warming oven that the switch 15 may be placed. In some instances the warming oven may be entirely dispensed with or may be transferred to the wall 13 of the housing 1.

With the rotary grid or cooking member 16 slowly revolved, the food thereon may be uniformly and sanitarily cooked, and when it is desired to remove food from the rotary grid, the switch 15 may be operated to stop the motor 6, and for loading or unloading the rotary grid may be manually turned.

It is thought that the utility of my invention is apparent without further description, and while in the drawing there is illustrated a preferred embodiment of my invention, it is to be understood that the structural elements are susceptible to such changes in size, shape and manner of assemblage as fall within the scope of the appended claims.

What I claim is:—

1. A cooking apparatus comprising a horizontally disposed partitioned grid, said grid having a central circular wall with vertical partitions extending radially therefrom to the edges of the grid, a burner above said grid adapted to project its flames toward said grid, and electrical means and gearing below said grid adapted for imparting a rotary movement to said grid.

2. A cooking apparatus as characterized in claim 1 and wherein the grid has it bottom inclined toward the grid center and provided with drain openings, a burner above said grid, and electrical power means inclosed by the apparatus adapted for rotating said grid.

3. A cooking apparatus as characterized in claim 2, and wherein a collecting receptacle is adapted to receive drippings from the center of said grid, and a basting tube extending between said burner and said grid and in a radial direction relative to the center of the grid.

4. A cooking apparatus comprising a housing, a rotary grid in said housing, a circular burner above said grid, a baking oven above said burner, means carried by the inner wall of said housing supporting said burner and constituting the sole supporting means of said oven, and electrical means within said housing adapted for imparting a rotary movement to said grid.

5. A cooking apparatus as characterized in claim 1 and wherein the partition of said grids support screens above the grid in the compartments formed by the partitions of said grid, and a burner serving said grid.

In witness whereof I attach my signature in the presence of two witnesses.

ALEXANDER P. COLIAS.

Witnesses:
KARL H. BUTLER,
LEWIS E. FLANDERS.